(12) United States Patent
Radziewicz et al.

(10) Patent No.: US 8,509,394 B2
(45) Date of Patent: *Aug. 13, 2013

(54) AUTOMATED RINGBACK UPDATE SYSTEM

(75) Inventors: Clifford J. Radziewicz, Hillsborough, NJ (US); Mark R. Gregorek, Mahwah, NJ (US); Jeffrey C. Dillow, Sparta, NJ (US)

(73) Assignee: Eclips, Inc., Hillsborough, NJ (US)

( * ) Notice: Subject to any disclaimer, the term of this patent is extended or adjusted under 35 U.S.C. 154(b) by 273 days.

This patent is subject to a terminal disclaimer.

(21) Appl. No.: 13/149,795

(22) Filed: May 31, 2011

(65) Prior Publication Data

US 2011/0243317 A1 Oct. 6, 2011

Related U.S. Application Data

(63) Continuation of application No. 11/142,891, filed on Jun. 1, 2005, now Pat. No. 7,953,211.

(51) Int. Cl.
*H04M 1/64* (2006.01)

(52) U.S. Cl.
USPC ............ 379/76; 379/88.23; 379/167.08; 379/263; 379/373.02; 235/462.15

(58) Field of Classification Search
USPC .......... 379/48, 67.1, 72, 76, 88.23, 167.08, 379/221.08, 263, 373.02, 88.17, 352; 370/352; 235/462.15
See application file for complete search history.

(56) References Cited

U.S. PATENT DOCUMENTS

| | | | | |
|---|---|---|---|---|
| 4,811,382 | A | * | 3/1989 | Sleevi ................... 379/67.1 |
| 5,932,863 | A | * | 8/1999 | Rathus et al. ........... 235/462.15 |
| 7,558,384 | B2 | * | 7/2009 | Tischer ................ 379/373.02 |
| 2006/0147021 | A1 | * | 7/2006 | Batni et al. ............. 379/221.08 |

* cited by examiner

*Primary Examiner* — Md S Elahee
(74) *Attorney, Agent, or Firm* — Ward & Zinna, LLC

(57) ABSTRACT

An automated ringback update system for customizing ringback signals is disclosed. Communications devices activate and interact with the automated ringback update system via the recognition of a feature associated with a printed matter to allow for modifications of the network service.

27 Claims, 15 Drawing Sheets

AUTOMATED RINGBACK UPDATE SYSTEM

CROSS-REFERENCE TO RELATED APPLICATIONS

This is a continuation of application Ser. No. 11/142,891, filed Jun. 1, 2005, which is hereby incorporated by reference in its entirety.

FIELD OF THE INVENTION

The present invention relates generally to the customization of a communications network and, more particularly, to the customization of a communications network including replacement ringback announcements and the system for electronically associating a network address or telephone number with custom replacement ringback content using a machine recognizable feature or printed feature, such as a barcode.

BACKGROUND OF THE INVENTION

Most conventional communications networks today, particularly existing telephone networks, provide a calling party with an audible ringback signal when an intended called network address or station line is idle and a busy signal when the intended called network address or station line is already in use (i.e., the telephone or other device at the called network address is being used). Conventional networks also provide a calling party with an audible dial tone signal when the telephone or other device at the calling station signals the network that they wish to initiate a call or network communication and a line is available. Most conventional communications networks today, particularly existing telephone networks, also provide advanced features, such as call waiting. The call waiting feature allows a station or device already connected to another station or device to temporarily disconnect from a first call and receive a second incoming call, and then switch between the calling parties.

For example, U.S. Pat. Nos. 5,557,658, 5,428,670, and 5,321,740 to Gregorek et al., incorporated herein by reference, disclose the selective modification or replacement of at least a portion of a call progress signal, including the conventional aforementioned ringback signal, dial tone, busy signal, call waiting signal, and call waiting idle time, with prerecorded announcements and/or audio/video programming. These announcements and/or programming provide more information to a calling party. The replacement announcements and tones can be tailored to a specific calling party and can be associated with a calling party's unique network address or telephone number.

Custom ringback announcements allow for an additional level of flexibility and personalization of a user's communications network service. To customize the system, a user of a replacement ringback system, the network provider, or a third party might wish to deliver, for example, audio/video programming, music, interactive games, jokes, personalized messages, or informational messages to a calling party to supplement and/or replace the conventional ringback tones played to the calling party. Furthermore, replacement content can be customized for a specific calling party or group of calling parties. The replacement ringback system offers a convenient and simple way to extend a caller's communication experience and takes advantage of a previously unutilized call transmission period.

In addition, replacement ringback tones and announcements offer almost limitless applications in the marketing industry. Typically, a caller experiences a rather large amount of unused idle time when waiting for a called party to answer his or her telephone. A caller may also be put on hold for several minutes while the called party answers another inbound call (e.g., a called party may place an initial caller on call-waiting or hold to answer a second inbound call). Since ringback tones can be played to all parties, regardless of the called party's or calling party's own carrier or calling transmission means (i.e., whether the caller is calling from a wireless link or land line, etc.), replacement ringback tones are an ideal medium for advertising. Substantial revenue can be gained by taking advantage of this idle time to deliver advertisements pertaining to consumer goods, products, services, etc. provided by a particular corporation or individual. Further, since communication devices are virtually ubiquitous and universally used, ringback tones have the potential to reach a large, targeted audience very quickly and efficiently. For example, businesses may use replacement ringback tones to deliver company slogans, jingles, and promotions to increase exposure and publicity.

As the adoption of the technology identified in the above-referenced application is emerging, certain drawbacks in the user interface for enabling the functionality of the application are arising. For example, a subscriber is usually required to notify the network provider in advance if the subscriber desires a new ringback replacement association via a Short Message Service (SMS) message, email, or telephone call to the communications network's voice response system or call center. This advance notification, for example, usually contains at least the network address or addresses to be associated with the new ringback content and an identification of the desired replacement ringback content. Alternatively, a communications network may utilize a website designed to facilitate interaction with the network's ringback replacement system. After an authentication and identification process, a user of a replacement ringback website may specify new ringback content to be added to the user's ringback service via a user-friendly web interface and a series of graphical prompts and menus. The desired ringback content may be already stored on the communications network (or a third party location) or the user may select local content to be transferred to a storage location accessible by the communications network. The website may utilize standard HTTP upload functionality, File Transfer Protocol (FTP), or any other data transfer or upload mechanism to initiate the transfer of the replacement ringback content to the communications network. The network provider then makes the necessary changes to the subscriber's service to associate the appropriate network address or addresses with the desired ringback content.

Also, notification and confirmation by external means are often required to update or change the ringback content for an already-existing ringback association. For example, an exchange of emails may be required to effect the change in service, or a visit to a website may be necessary to modify replacement ringback functionality. This often inconvenient and time-consuming method of updating or adding new ringback content to a user's service discourages subscribers of a ringback replacement service from frequently modifying or adding new ringback replacement associations, thus reducing potential revenue by deterring regular and repeated ringback content purchasing and utilization.

Systems are known in the art for accessing media via printed matter. For example, U.S. Pat. No. 5,932,863 to Rathus et al. discloses the use of a machine recognizable feature associated with a printed matter to obtain more information about the printed matter. A user can access related programming material simply by scanning or otherwise electronically recognizing a machine recognizable feature. For example, a barcode may be scanned in a magazine advertisement to access purchasing information on the Internet or display a music video related to the magazine advertisement.

In order to streamline ringback tone content, a system is needed to readily modify ringback tones via a communications device or station. Since many communications devices feature integrated or attachable recognition units (e.g., scanners, cameras, readers, microphones, sensors, or the like), it would be advantageous if the subscribers of a custom ringback replacement service could utilize a printed matter, such as a brochure, book, magazine, newspaper, advertisement, or the like, associated with a machine recognizable feature, such as a barcode, digital watermark, hologram, indicia, symbol, picture, or the like, to automatically select and interact with a system for customizing replacement ringback content on a communications network. Thus a seamless system is needed that is accessed directly from a user's handset or station, for easily modifying or adding ringback associations to a subscriber's service using a printed feature or machine recognizable object.

SUMMARY OF THE INVENTION

The present invention comprises an automated ringback update system for adding ringback content or announcements to a subscriber's network service directly from the subscriber's handset or station. Ringback content or announcements could comprise audio (e.g., music, jingles, sound effects, or live or prerecorded voice), video (e.g., interactive games, movie clips, or live or prerecorded video), data (e.g., pictures, computer screen shots, electronic documents, spreadsheets, databases, etc.) or a combination of audio, video, and data, as well as other programming material. The present invention is further directed to a system for electronically recognizing a printed feature, thereby automatically creating or modifying replacement ringback associations. Ringback associations are simple logic used to determine what ringback content is played to which incoming callers. For example, a ringback association might specify that a certain advertisement is to be played to all incoming callers calling from the "212"—New York City area code. Another ringback association might specify the playing of The Star-Spangled Banner to all incoming callers calling on July 4 of each year. In the present invention, the ringback update system is accessed via hard or soft keys on a user's handset, an attachable keypad or keyboard, a voice-activated speech recognition module, or the like modes of access. The system may also be accessed via the recognition of a printed feature or machine recognizable object. Based on the input, the system may connect to a storage device for the subscriber to select a desired ringback announcement (for example, a video clip, music, an advertisement, an interactive game, news footage, or some other programming material) already stored within the communications network or a locally stored announcement to be uploaded to the ringback system. Then the subscriber either manually inputs or automatically chooses by speaking predetermined voice commands translated to common phonemes a desired network address or telephone number to be associated with the previously selected ringback announcement. As a result, the user's communications network (or a third party contracted to provide ringback services on behalf of the user's communications network) requests the ringback system to play the newly associated announcement to the calling party whenever the selected network address or telephone number calls the subscriber. Users of the present invention include any end user, such as subscribers to the network service provider, as well any originating, terminating, or intermediate network service providers themselves, and third party users, such as advertisers.

The present system is also directed to a ringback update system which is capable of modifying currently associated network addresses or telephone numbers with new ringback announcements (or revert to conventional tones) directly from a user's handset or station. The subscriber selects the currently associated network address or telephone number and then chooses a new replacement ringback announcement. The ringback system then plays the newly-associated announcement to the calling party whenever the calling party calls the subscriber from the selected network address or telephone number. For example, a user, who knows that one of the user's frequent callers has an affinity for classical music, might update the ringback association for that frequent caller as new classical releases become available.

BRIEF DESCRIPTION OF THE DRAWINGS

A further understanding of the present invention can be obtained by reference to a preferred embodiment as set forth in the illustrations of the accompanying drawings. Although the illustrated embodiment is merely exemplary of systems for carrying out the present invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the specific methods and instrumentalities disclosed.

For a more complete understanding of the present invention, reference is now made to the following drawings in which.

DETAILED DESCRIPTION OF THE PREFERRED EMBODIMENTS

As required, a detailed illustrative embodiment of the present invention is disclosed herein. However, techniques, systems, and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for the purposes of disclosure and to provide a basis for the claims herein, which define the scope of the present invention. The following presents a detailed description of a preferred embodiment (as well as some alternative embodiments) of the present invention.

Figure 1:
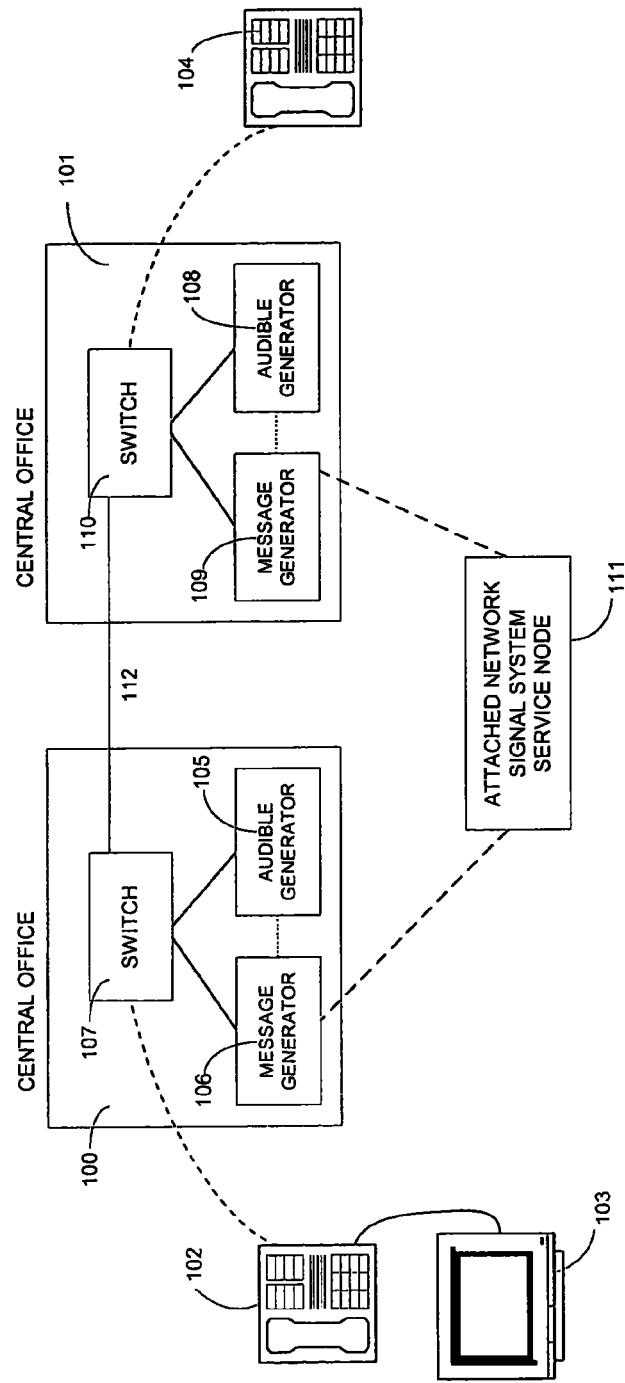
FIG. 1 (PRIOR ART) is a block diagram of a common ringback replacement system.

Referring to the drawings wherein like numerals indicate like elements throughout, there is shown in FIG. 1 (PRIOR ART) a conventional network-originated system for supplying replacement ringback content in accordance with a typical ringback control system. As is well known in the art, when a user of first telephone 102 initiates a call, a connection is formed with first switch 107 at first local central office 100, which is usually associated with a local telephone company. First switch 107 typically transmits a dial tone back to first telephone 102 to indicate the availability of the telephone service. The telephone number dialed or otherwise entered by the calling party using first telephone 102 or an associated device is transmitted to local central office 100 as a series of signals which are detected by first switch 107. First switch 107 refers to a network control point, network controller, or communications network traffic switching and control mechanism, such as a central office or premises-based audio, data, video, or hybrid switch, a packet switch, or Asynchronous Transfer Mode (ATM) switch, or any associated signaling network control point, service control point, or service switching point or system which routes, monitors, and/or handles and controls calls over a communications network. First switch 107 is responsible for determining the destination (network address) of the call based upon the transmitted signal (i.e., the number dialed). First switch 107 transmits the call initiated by the user of first telephone 102 over communications network 112 toward an identified network address or called station, which in the present embodiment comprises second telephone 104, but could comprise any other type of communication device. The called network address or station is identified by the telephone number or network address entered by the calling party at first telephone 102. Communications network 112 could be a local exchange network, interexchange network, long distance network, international network, telecommunications network, cable television network, broadcast network, switched network, dedicated network, the Internet, Voice over IP (VoIP) network, wireless network, Wi-Fi network, WiMAX network, or a hybrid type of the foregoing networks or any network similar to the aforementioned networks.

The call from the calling party is received by second switch 110 located at second local central office 101 which determines the status of second telephone 104 (i.e., whether second telephone 104 is in a busy state or in an idle state). Attached network signaling system service node 111 can also determine the busy/idle status of the called network address or station line. The specific procedure by which second switch 110 or attached network signaling system service node 111 determines the busy/idle status of the called network address or station line is common and well-known to those skilled in the art.

Depending upon the configuration of the network, either first audible signal generator 105 and first message generator 106 or second audible signal generator 108 and second message generator 109 can transmit the call progress signals to the user of first telephone 102. For the purposes of discussion, when a user of first telephone 102 initiates a communication session with second telephone 104, second audible signal generator 108 and second message generator 109 may provide signals and/or announcements to the user of first telephone 102. Second message generator 109 is connected to second switch 110 and is capable of supplementing and/or replacing the signals generated by second audible signal generator 108. Second switch 110 or attached network signaling system service node 111 determines whether second audible signal generator 108 or second message generator 109 is activated. When a user of first telephone 102 initiates a communication session with second telephone 104, second switch 110 or attached network signaling system service node 111 activates second audible signal generator 108 to provide a conventional audible ringback signal and activates second message generator 109 to play a series of prerecorded announcements (i.e., replacement ringback content) to the user of first telephone 102. First telephone 102 may also be attached to display 103 for the transmission of video signals. It is to be understood that the signal generation functions of second audible signal generator 108 and second message generator 109 could alternatively be provided by third-party or outside audible signal and message generators as required by the communications network.

In most wireless, cellular, and trunked telephone networks, upon network access the transmission of a dial tone by first switch 107 is suppressed. In addition, typically the busy/idle status of second telephone 104 determines if a caller to a wireless or cellular station is automatically transferred to a network voice mail system; if a user's communications station is busy, off-line, powered off, or cannot be located, a caller is most often redirected to a network voice mail box in lieu of the transmission of a busy signal. Message generator 109 may similarly deliver announcements to users calling wireless, cellular, or trunked stations before, after, or during any transfer to a network voice mail service.

Announcements are enabled by inserting a software subroutine into the call processing software of the network. The various mechanisms for incorporating software into the call processing system of the network are well-known to those skilled in the art. The software subroutine causes call processing procedures to be modified and allows first message generator 106, second message generator 109, or a third-party message generator to become an integral part of the call completion sequence.

Second message generator 109 can also play certain messages based on the time of day, day of week, month of year, or any other time frame reference or window. An integrated or external clock may be synchronized with second message generator 109 for monitoring the time of day, day of week, and month of year. When a call is placed to second telephone 104 from first telephone 102, and second message generator 109 has been signaled to initiate a message sequence, the information from the clock is read by second message generator 109 and is compared to information located in a look-up table in the memory of second message generator 109 to determine which messages are to be played. For example, a user of the present system could specify a prerecorded video to be transmitted to a calling party calling the user from video-telephone number "212-555-1212" on January 25 of each year (the user's birthday, for example) whenever video-telephone "212-555-1212" calls the user on January 25. As another example, a user could specify a certain holiday music clip to be delivered to all callers calling on Christmas Day, and a different music clip to be transmitted on all other days. Second message generator 109 retrieves designated messages until second telephone 104 is answered or the calling party abandons the call. It should be appreciated that, if desired, live announcements may be provided under the control of second message generator 109.

If second message generator 109 is set to determine which announcements are to be played based upon the area code and telephone number of first telephone 102, second message generator 109 can read the telephone number of the calling party as provided by the telephone network (e.g., second message generator 109 can use an automatic number identification (ANI) system or similar identification system(s) which are well-known in the art to identify the area code, telephone number, or other characteristics of the calling party) and determine the geographical location of the calling party by matching the telephone number with a location provided by an updateable look-up table linked to second message generator 109 and maintained by the central office, an affiliate thereof, or other third party. Second message generator 109 determines which announcements are designated for a particular area code and telephone exchange and plays the appropriate prerecorded messages until second telephone 104 is answered or until the calling party abandons the call.

It should also be appreciated that the present invention is not limited to traditional telephone networks (for example, PSTN or the like). With the evolution of enhanced services and the convergence of telephony with data interfaces, today's networks are increasingly merging with standard Internet protocols for signaling and media. It is now common in the art for some of these networks to allow for the separation of the signaling from the media transport. For example, an increasing number of Competitive Local Exchange Carriers (CLECs) and Internet Telephony Service Providers (ITSPs) are offering such services as local and long distance telephony, Voice over IP (VoIP), presence and instant messaging, push-to-talk, rich media conferencing, and more, based on Session Initiation Protocol (SIP). Unlike traditional telephone networks, users of SIP-based networks can locate and contact one another regardless of media content and the number of participants.

Figure 2:
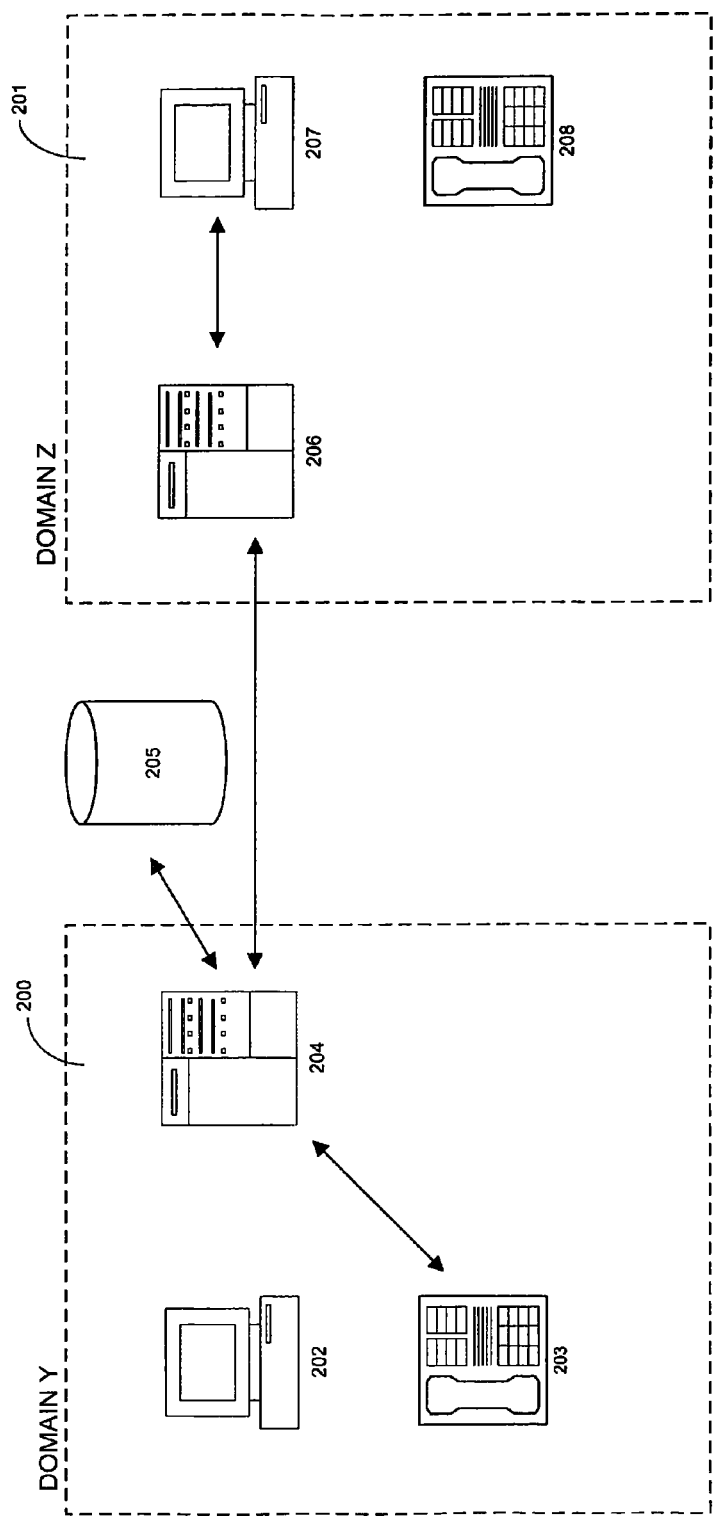
FIG. 2 is a block diagram in accordance with the handset-originated automated ringback update system of the present invention.

For example, FIG. 2 illustrates the interaction between two SIP-based user agents (each with a SIP address, such as sip:user@localhost.com) while establishing a communication session in different domains. SIP user agents may be any end-user devices, such as wireless telephones, multimedia handsets (e.g., video telephones), mobile computers, PDAs, or any other devices capable of creating and managing SIP sessions. As illustrated in FIG. 2, user agents 202 and 203 are located within first domain 200 and user agents 207 and 208 are located within second domain 201. User agent 203 within first domain 200, in attempting to establish a communication session with user agent 207 located in second domain 201, first contacts SIP proxy server 204 located within first domain 200 of user agent 203. SIP proxy server 204 may be any packet switch, proxy server, gateway, service control point, softswitch, call controller, or other like structure. SIP proxy server 204 recognizes that user agent 207 is outside its own domain and contacts SIP redirect server 205 for the network address of user agent 207. SIP redirect server 205 may be located in either first domain 200 or second domain 201 (or both domains) and responds to the proxy server's request with user agent's 207 contact information (e.g., current IPv4 or IPv6 address). SIP proxy server 204 forwards a session invitation to SIP proxy server 206 located in domain 201 identified by the contact information received from SIP redirect server 205. The invitation may include a session description (perhaps written in Session Description Protocol (SDP) format) that provides the called party with enough information to join the session. For multicast sessions, the session description enumerates the media types and formats that are allowed to be distributed to that session. For a unicast session, the session description enumerates the media types and formats that user agent 203 is willing to use and the desired location to send the media data.

Next, SIP proxy server 206 delivers the session invitation to user agent 207. If the session invitation is acceptable to user agent 207, user agent 207 creates an acknowledgment reply and forwards the reply back to SIP proxy server 206. Finally, SIP proxy server 206 forwards the acknowledgment back to SIP proxy server 204 located in first domain 200. SIP proxy server 204 then relays the acknowledgment back to the initiating user agent 203. User agents 203 and 207 may then create a point-to-point communication connection (e.g., using Real-Time Transport Protocol (RTP) or any other protocol or delivery method supported by user agents 203 and 207) enabling the two user agents to interact. Once a point-to-point connection is established, replacement ringback announcements may be delivered to user agent 203 from a variety of sources. For example, replacement ringback announcements may be delivered directly from user agent 207 when the underlying protocol signals user agent 207 to deliver its ringback announcement. Alternatively, replacement ringback announcements may be delivered to user agent 203 on behalf of user agent 207 from a network server, application server, media server, dedicated ringback server, or from a third-party server.

Figure 3:
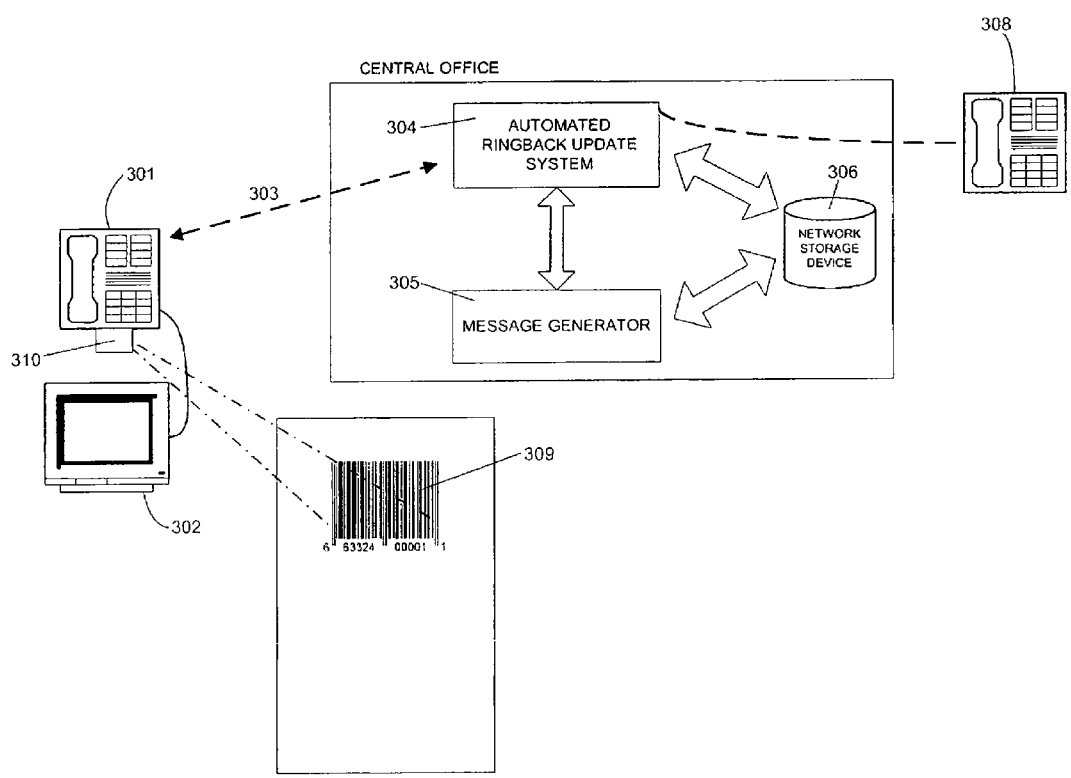
FIG. 3 is a block diagram in accordance with the network-originated automated ringback update system of the present invention.

Now referring to FIG. 3, a schematic block diagram of an automated ringback update system is shown in accordance with the preferred embodiment of the present invention. The present invention is designed for use with any type of communications network including any network capable of transmitting voice, data, video, multimedia, real time, store and forward, interactive, hybrid types of information, or other similar information services. The communications network may be provided by a private or publicly-owned local exchange, interexchange, long distance, international, telecommunications, cable television, broadcast, switched, dedicated, wireless, Voice over IP (VoIP), Wi-Fi, WiMAX, hybrid types of network providers, or other like networks. The communications network provided by these network providers may utilize wireless, facilities-based, satellite-based, hybrid types of transmission schemes and/or mechanisms, or other systems of similar function. For the sake of brevity and simplicity, the embodiments of the invention illustrated in the figures are specifically directed to a standard or typical telephone system used for providing voice communication between two individual network addresses (e.g., in the present embodiment, these network addresses correlate to telephone stations or telephones). However, it should be clearly understood by those skilled in the art from this disclosure that the present invention is not limited to access from such standard telephone stations or to telephone station communications systems. In addition, while in the described embodiment one or both of the telephone stations are illustrated as being typical or standard telephone instruments, the terms "station" and "handset" could refer to any device or object which may be connected to or be an integral part of a communications network. A communications network may allow for the initiation, receipt and/or interaction of audio and/or visual information. This information may include voice, data, video, multimedia, real-time, store and forward, interactive or hybrid types of information. It should also be clearly understood that the terms "station" and "handset" should be read to include, but not be limited to, devices such as wireless or cellular telephones, personal digital assistants, digital personal organizers, televisions, video monitors, video telephones, computers, television set-top converters, modems, video servers, front end processors, other communications networks, and combinations or hybrids thereof.

Still referring to FIG. 3, automated ringback update system 304 is in communication with network storage device 306 and message generator 305. As is common in the art, network storage device 306 maintains the ringback replacement content on behalf of the subscribers of the service in indexed files. Although network storage device 306 is depicted as an internal central office device, it is contemplated that network storage device 306 may be external to the central office. It should be appreciated that if the communications network is a packet-based network (e.g., the Internet, WAN, LAN, VoIP, or virtual private network), or a point-to-point network, storage device 306 may be internal to the called station and certain functionality common to a switched-environment central office may be delegated to the handset device. As also known in the art, each file of ringback replacement content can be accessed by a unique identification number or name, assigned either by the communications service provider or by network storage device 306. By pressing a hard, soft, or touch key on telephone 301, or through the use of an attachable input instrument or voice recognition module (or like device), telephone 301 connects to the automated ringback update system 304 through communication link 303 available to telephone 301. Communication link 303 may comprise a portion of the main communications network accessible by telephone 301, or may be a supplemental, peripheral, or ad-hoc network designed primarily for accessing automated ringback update system 304. In the preferred embodiment, communication link 303 is a wireless link, comprising part of a Cellular Digital Packet Data (CDPD), High Speed Circuit Switched Data (HSCSD), Packet Data Cellular (PDC), Time Division Multiple Access (TDMA), Code Division Multiple Access (CDMA), 1xRTT, Global System for Mobile Communications (GSM), General Packet Radio Service (GPRS), Bluetooth, Wi-Fi, WiMAX, 2G, 3G, Local Multipoint Distribution Service (LMDS), Multichannel Multipoint Distribution Service (MMDS), or other wireless network, including protocols not yet implemented, utilizing Wireless Application Protocol (WAP) or the equivalent thereof. It will also be appreciated by those skilled in the art that communication link 303 could comprise a portion of any wired or wireless communications network over any communication or network protocol designed for data transmission.

Automated ringback update system 304 may also be accessed via integrated or attachable feature recognition unit 310. Upon recognition of a printed feature 309, shown as a barcode in the preferred embodiment (but can comprise any printed matter or feature capable of being actuated or recognized by a machine), telephone 301 or feature recognition unit 310 (with integrated controller) transmits a coded signal indicative of printed feature 309 over communication link 303. Automated ringback update system 304 receives the coded signal over communication link 303 and automatically configures the subscriber's replacement ringback service. For example, printed feature 309 may be a barcode on an advertisement for a newly released music album. With the recognition of printed feature 309 by integrated or attachable feature recognition unit 310, automated ringback update system 304 may automatically add a new ringback announcement to the user's replacement ringback inventory. For example, the title song from the newly released music album depicted in the advertisement associated with printed feature 309 may be added to the user's ringback replacement service and automatically configured as the user's replacement ringback announcement for all incoming callers upon recognition of printed feature 309. Automated ringback update system 304 may download and purchase the replacement ringback announcement from storage device 306 upon recognition of printed feature 309, if required or desired. If the selected ringback announcement does not already exist on the communications network (e.g., other users have not already caused the communications network to download the announcement) then the announcement may be downloaded via Short Messaging Service (SMS), Enhanced Messaging Service (EMS), Multimedia Messaging Service (MMS), Wireless Application Protocol (WAP), or any other available service or protocol the network supports for downloading ringback content and then added to the user's ringback inventory. If the communications network supports delivery of ringback signals directly from telephone 301 (as in the case of a packet-based, VoIP, or SIP-based network), the desired ringback announcement may be downloaded to telephone 301.

Telephone 301 could also be connected to (or comprise an integrated) video display unit 302, such as a computer terminal, video terminal, LCD screen, LED display, plasma display, telephone monitor, or matrix display for the transmission of video signals. It is to be understood by those skilled in the art that automated ringback update system 304 is not limited to access from a conventional wireless telephone device. For example, the automated ringback update system 304 can be accessed from any state of the art communications device, including web-enabled wireless telephones, video telephones, mobile and desktop computers, and digital personal assistants or hybrid devices with telephony or communications capabilities.

Automated ringback update system 304 monitors all call initiation requests with telephone 301. When another caller attempts to initiate communication with telephone 301, automated ringback update system 304 analyzes the incoming station identification. As is common in the art, incoming station identification is specific to the underlying communications network and can include a network address (e.g., an IP address), a Uniform Resource Locator (URL), a telephone number obtained from "caller ID" or automatic number identification (ANI), or any other station identifying means capable of being ascertained by the communications network or telephone 301. For example, SIP signaling messages, Q.931 signaling messages, or packet headers might be analyzed for calling party address information. Simple logic within automated ringback update system 304 compares this incoming identification information with all the replacement ringback associations created by the user of telephone 301, the network provider, or a third party. If an association matches an incoming network address or telephone number, message generator 305 plays the appropriate replacement ringback content to calling telephone 308 until telephone 301 is answered or the caller abandons the call.

Figure 4:
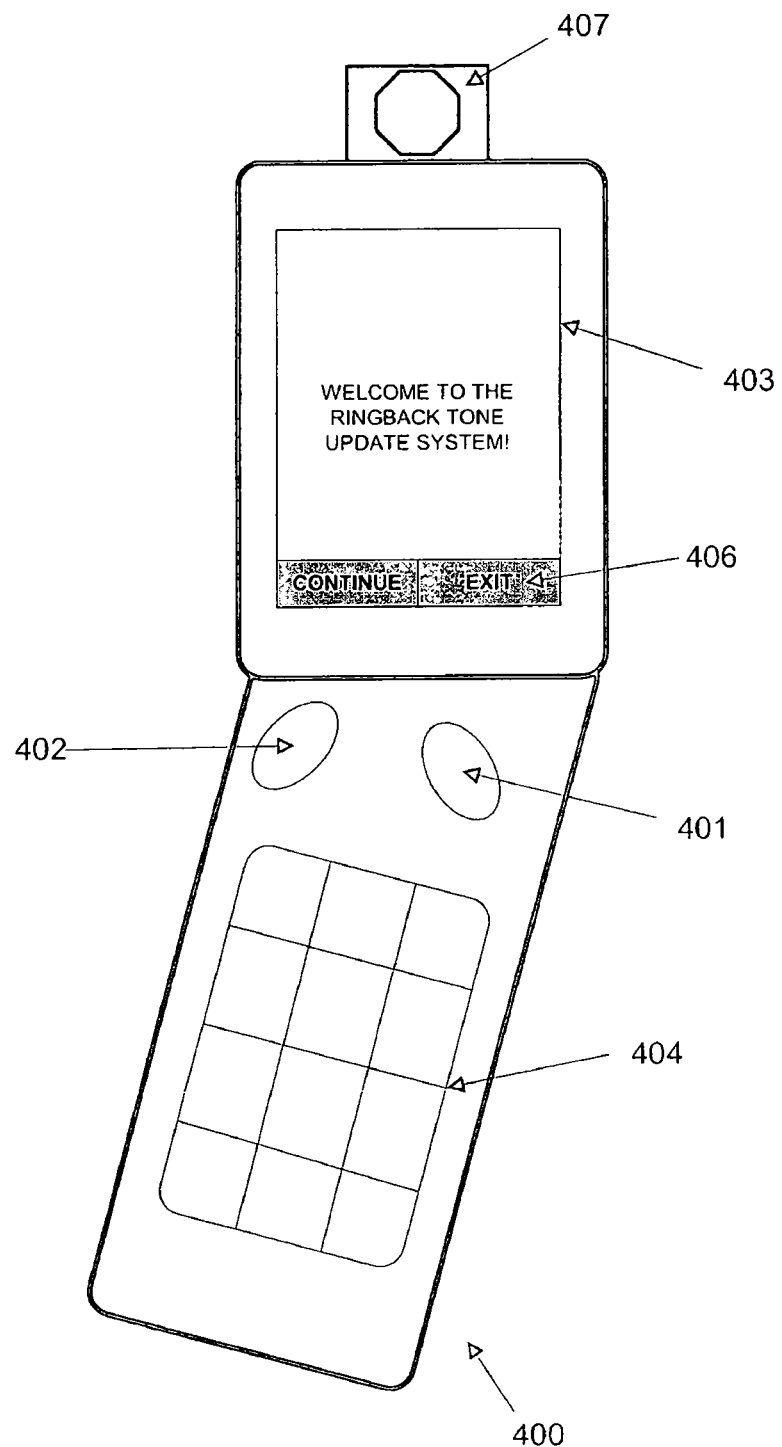
FIG. 4 depicts a wireless telephone with a display and hard, soft, and touch keys used to activate and interact with the automated ringback update system.

As shown in FIG. 4, depicted is wireless telephone 400 with integrated display 403 used in accordance with the preferred embodiment of the present system. Integrated display 403 can be a liquid crystal, LED, plasma, active-matrix, flat-panel, or any other display or device used to display information to a user, such as output video or graphical signals. Integrated display 403 can further comprise a touch screen. In this scenario, the automated ringback update system may be accessed by a user touching a pen or stylus to the appropriate touch buttons 406 on the touch screen. Navigation and data entry are also supported via touch buttons preferably positioned on integrated display 403. Alternatively, the user accesses the ringback system by utilizing soft keys 401 or hard keys 402 integrated within or positioned local to keypad 404. Wireless telephone 400 may also include a secondary attachable keypad or keyboard that facilitates access to and use of the automated ringback update system. In addition to using hard, soft, touch, or attachable keys, a user of the automated ringback update system may use a voice recognition module integrated within wireless telephone 400 to access, navigate, and input selections into the automated ringback update system. As is well-known in the art, speech recognition may be used to dial telephone numbers, access applications and features, navigate screens, and input data. With the use of voice recognition, a user may access and control the present invention without the use of a traditional input device; however, a combination of the input systems and methods may be utilized. A user of the present invention may also utilize integrated or attachable feature recognition unit 407 to access and interact with the automated ringback update system. For example, a barcode, magnetic strip, watermark, hologram, printed indicia, or any other printed feature capable of being recognized by a machine, may be captured, scanned, swiped, or otherwise recognized by feature recognition unit 407 to facilitate automatic access and data entry. Feature recognition unit 407 may comprise any recognition device, including, but not limited to, a scanner, a sensor, a magnetic swipe reader, a camera, an infrared receptor, a quantum dot sensor, or an RFID transceiver or reader. Feature recognition unit 407 may also include an integrated intelligent controller.

Figure 5:
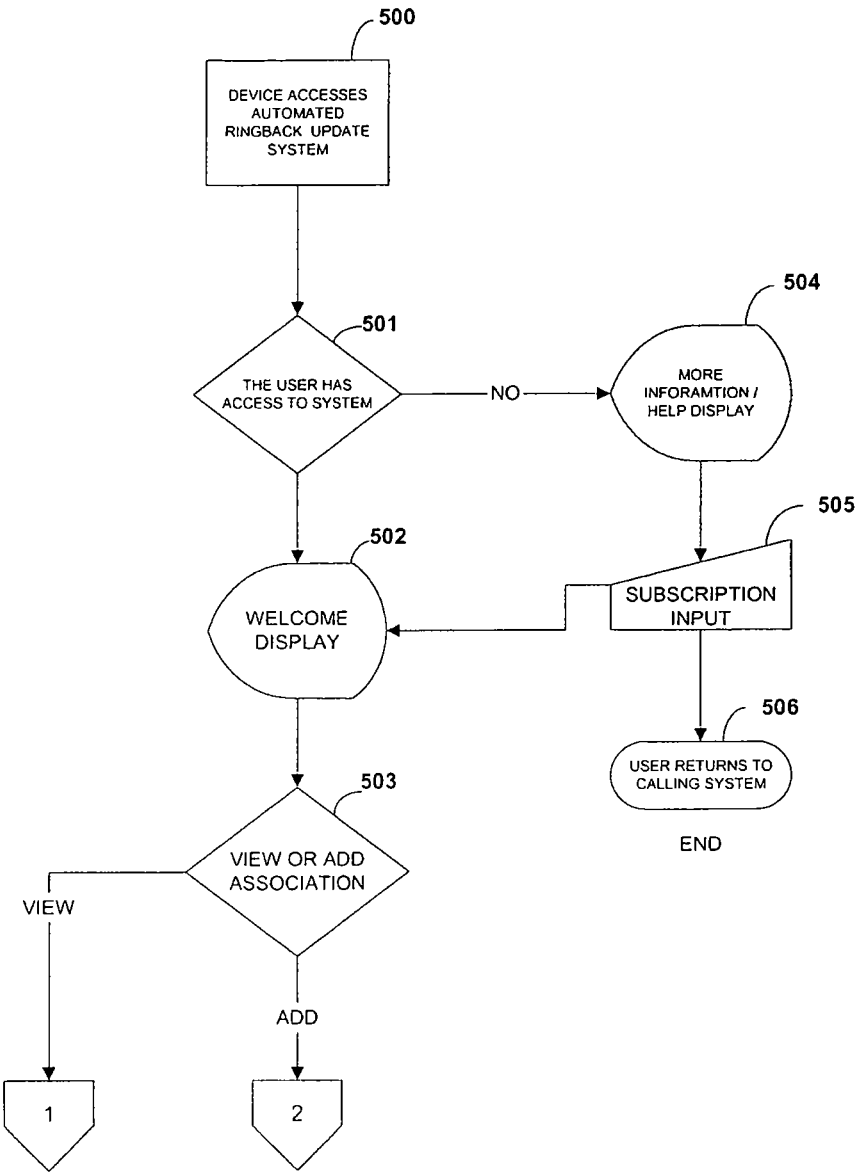
FIG. 5 is a flow diagram illustrating the initial interaction between a user and the automated ringback update system.

Now referring to FIG. 5, a flowchart of the preferred embodiment of the present invention is shown depicting the interaction between a user and the automated ringback update system. A user accesses the automated ringback update system 500 using one of the access methods described above. The first step of interaction between the user and the automated ringback update system is authorization routine 501 which verifies the current status of the user. Within authorization routine 501, user status is confirmed and verified to determine if access to the automated ringback update system should be granted. For example, if the user is not currently authorized to use the ringback system, the user may be required to subscribe to the ringback service. If the user is unauthorized, authorization routine 501 presents the user with help screen 504. Help screen 504 prompts the user to verify or confirm that subscription to the ringback service is desired. If subscription to the service is requested, the user may be required to input billing information or personal identifying information, such as a password, PIN, or social security or account number, at subscription input stage 505 in order to complete subscription to the ringback service. Data is provided to the system through hard, soft, attachable, or touch keys, or via voice recognition. If the subscription process does not complete successfully, or if the user chooses to cancel the subscription process, the user is returned to the calling system at exit stage 506.

In addition, if the user's account is determined to be presently delinquent, authorization stage 501 requests the user to provide immediate payment information via help screen 504 and subscription input stage 505 in order to bring the user's account into good standing. This may be achieved by authorizing an automatic one-time debit of the user's credit or checking account linked with the user's account, or by presenting the user with subscription input screen 505 so that the user might type, touch, or speak the user's billing information into the system. If the user's account is not determined to be in good standing at the conclusion of subscription input screen 505, the user is returned to the calling system at stage 506.

On the other hand, an authorized user, or a user who has presently become authorized or subscribed, is presented with welcome display 502 indicating that the user has successfully activated the automated ringback update system. Welcome display 502 may additionally be supplemented to display targeted content to the user accessing the ringback update system. The targeted content may be selected based on the current location of the user accessing the system (determined by the user's network address or telephone number), or targeted content may be determined based on user-supplied or user-derived interests. For example, a user accessing the system from a New York City area code might be presented with local advertising, music, news, or information important to New York City residents or visitors. In another example, a user who has expressed an interest in outdoor cycling via an online survey might receive content regarding bicycles and related supplies at welcome display 502. Additionally, welcome display 502 might alert the user to new ringback content available on the network since the user last accessed the system. The automated ringback update system includes logic for determining a genre or category of content preferred by the current user (based on previous content selections or user-supplied information) and automatically alerts the user to new content matching the user's interests. At view or add association stage 503, the user next chooses whether to view or add a ringback association. In one embodiment, the user enters the appropriate key (e.g., selects "1") to view or update a ringback association, and the user enters a distinct appropriate key (e.g., selects "2") to add a new association. In another embodiment, at view or add association stage 503 the user presses a soft key on the user's handset to highlight and select "CHANGE" or "ADD" on the station's integrated display.

Figure 6:
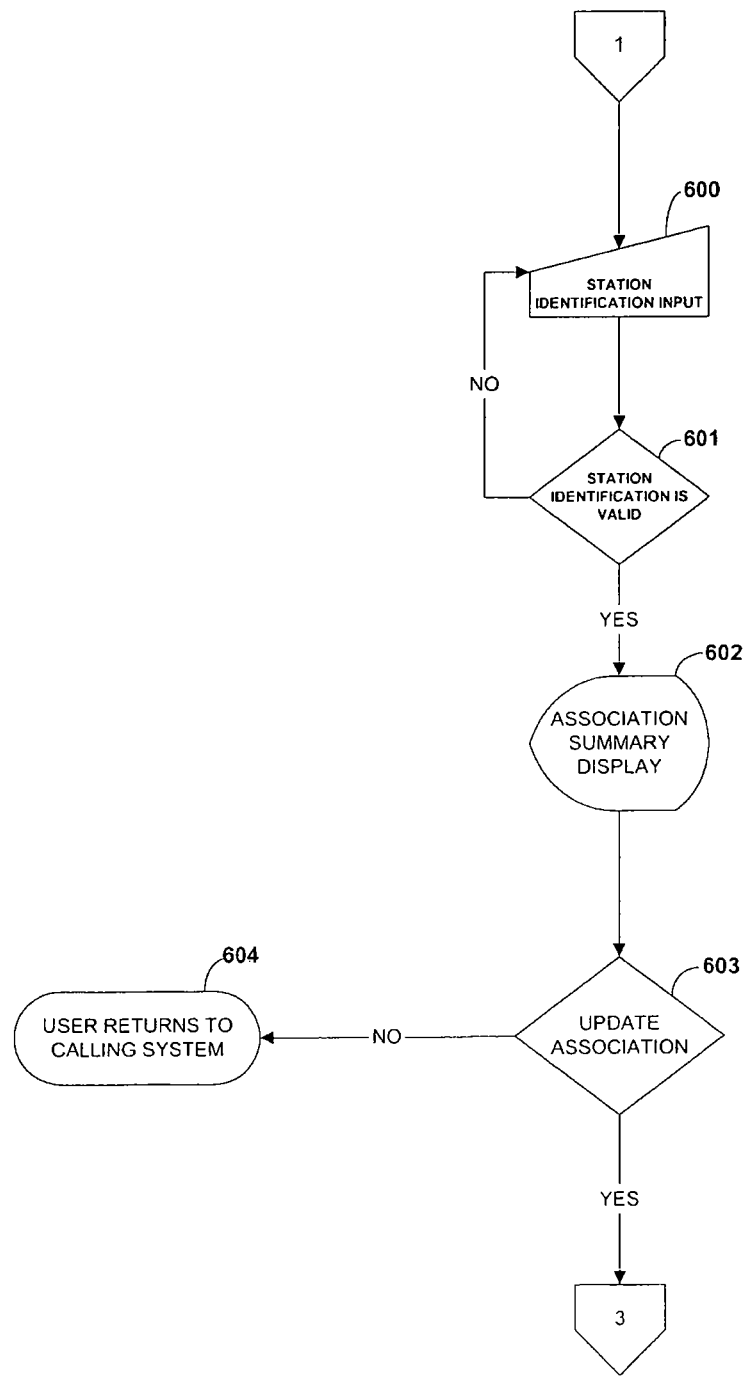
FIG. 6 is a flow diagram illustrating the interaction between a user and the automated ringback update system for viewing a ringback association.

To view or update a replacement ringback association, the user follows the interaction depicted in FIG. 6. First, the user enters the desired calling station identification at station identification input 600. The system verifies the inputted identification at station validation stage 601, and if a valid identification is entered, the system presents a summary display 602 of the association with the specified calling station identification. If an invalid station identification is entered, the user is returned to station identification input 600 until a valid station identification is entered. Once the summary display 602 is presented to the user, the user can select to exit the system or update the association at update association stage 603. If the user chooses not to update the association, the system returns the user to the calling system at exit stage 604.

Figure 7:
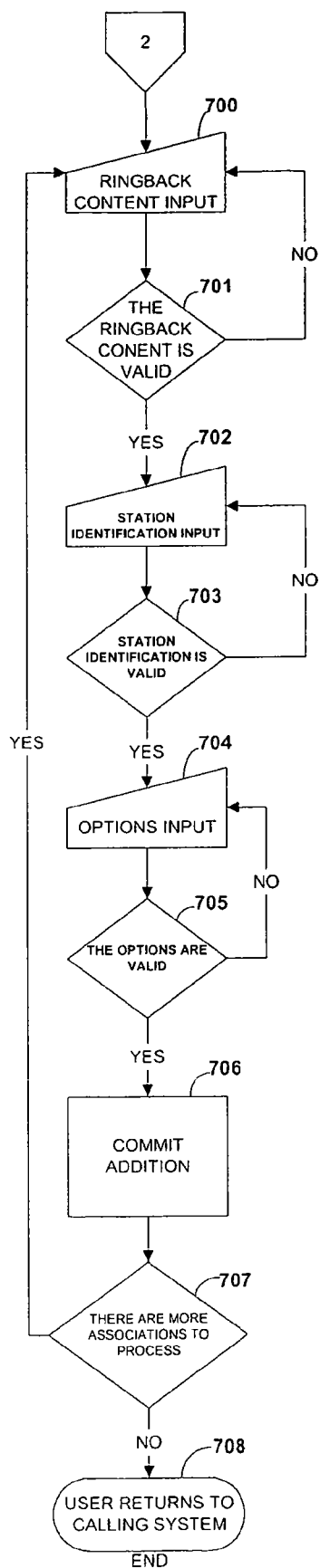
FIG. 7 is a flow diagram illustrating the interaction between a user and the automated ringback update system for adding a new ringback association.

To add a new ringback replacement association, the user follows the interaction depicted in FIG. 7. The user first enters a unique alphanumeric corresponding to the desired ringback announcement at ringback content input 700. Unique ringback alphanumeric codes can be accessible through numerous sources. For example, ringback alphanumeric codes may be published on the communications network's website or the codes could be periodically downloaded to a file on the user's handset. In one embodiment, unique alphanumeric identification codes corresponding to available ringback content are cached in a file on the user's handset. In an alternate embodiment, the system directly queries the communications network for its list of available ringback announcements stored on the network. If the ringback announcement alphanumeric identification codes are cached on the handset in a file, this file may contain the title and the identification alphanumeric of each ringback announcement stored on the network provider's storage device(s). In addition, a short description of the ringback content and its genre are included, if available. The user looks up the desired replacement ringback announcement in the file and inputs the identification alphanumeric corresponding to the desired announcement. The user may also optionally utilize a feature recognition unit to scan, read, or capture a machine recognizable feature. By recognizing the feature, a coded signal corresponding to a ringback identification alphanumeric is transmitted to the automated ringback update system. The system automatically converts the coded signal to its corresponding alphanumeric by consulting an updateable look-up table or database. If the user desires to remove an association, the user enters the null ringback identification alphanumeric at ringback content input 700 (e.g., the user selects "0"). The null announcement erases an association and reverts the caller's ringback tone to the conventional tone.

At ringback content input 700, the ringback update system also includes a search feature to assist the user in finding the correct ringback identification alphanumeric based on the first few letters of the title, genre, or artist of the content. For example, a user entering the letters "REGG" into the search engine might match the "reggae" musical genre, causing the automated ringback update system to display a list of all musical content in the reggae genre available on the network to be used as ringback content. Next, the identification alphanumeric is verified by the system at ringback content validation stage 601. Valid identification alphanumerics consist of all the existing and available ringback announcements on the communications network or the null announcement (for reverting to conventional tones). If an invalid ringback identification is entered, the user repeats ringback content input 700 until a valid identification alphanumeric is entered. After a valid ringback identification is selected, the user next enters the station identification of the calling party that the user wishes to associate with the ringback announcement at station identification input 702. The user may enter a wildcard character (e.g., the number 0) to match all network addresses. Station verification stage 703 verifies that the station identification entered is valid, and the system proceeds to options input 704. If an invalid station identification is entered, the user returns to station identification input 702 until a valid identification is entered. At options input stage 704, the user inputs optional parameters, including a time reference (e.g., the time of day, day of week, day of month, or month of year), for the delivery of the replacement ringback content. Options verification stage 705 checks the configured parameters for correct syntax and commit stage 706 commits the new replacement ringback association to the communications network. Thus, the replacement ringback addition may be added to the system in real-time, or, alternatively, if desired, the associations may be cached by the network for bulk additions at a later time. If the new ringback association specifies a network address that is already associated with a replacement ringback announcement, the new association takes precedence and overwrites the previous association. Lastly, a message is presented to the user at more associations to process stage 707 inquiring if there are more ringback associations to process. An affirmative answer at more associations to process stage 707 restarts the entire process at ringback content input 700 whereas a negative answer at more associations to process stage 707 exits the ringback update system and returns the user to the calling system at exit stage 708.

Figure 8:
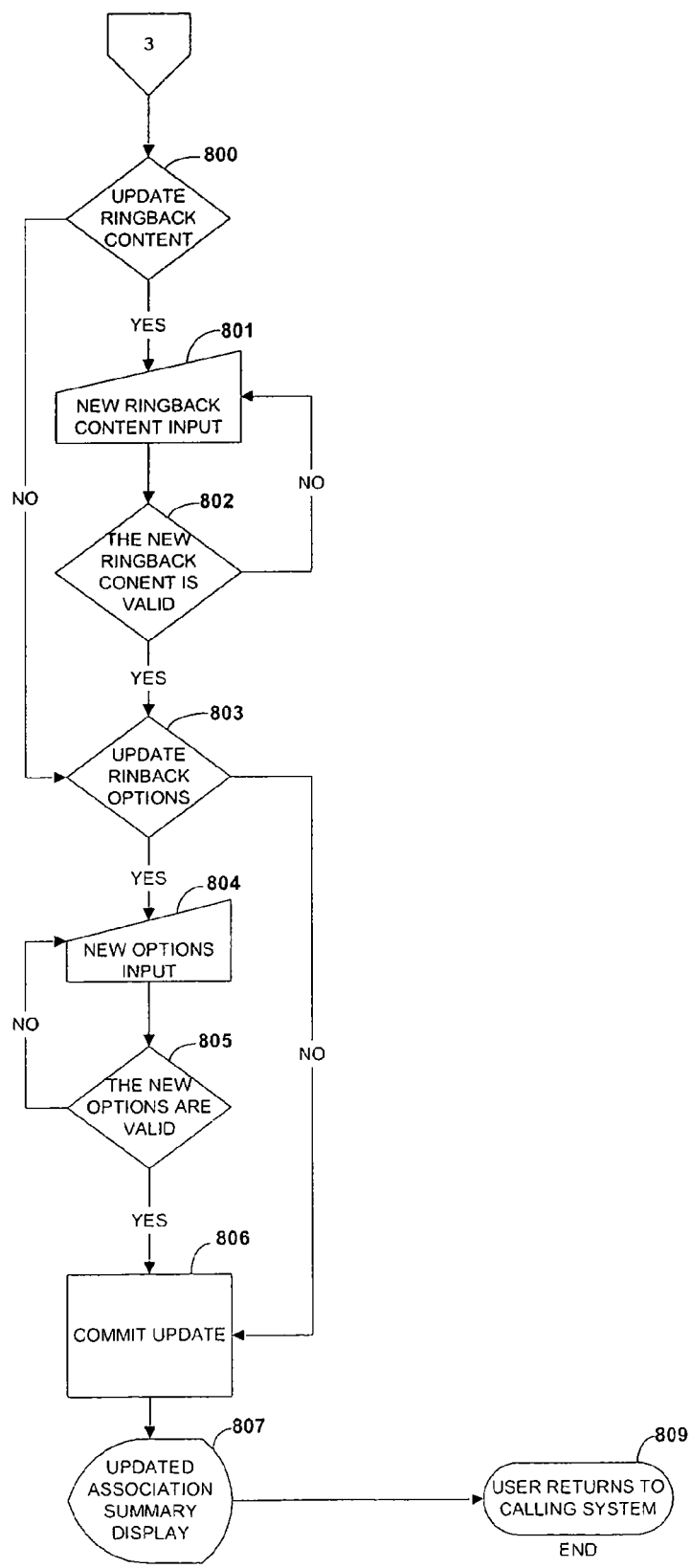
FIG. 8 is a flow diagram illustrating the interaction between a user and the automated ringback update system for modifying an already existing ringback association.

If modifications are desired, the user's interaction with the system is depicted in FIG. 8. First, the user decides at update ringback content stage 800 whether the ringback announcement is to be updated. An affirmative answer at update ringback content stage 800 brings the user to the ringback identification input stage 801. The ringback identification is validated at ringback validation stage 802, and the user is presented with options update stage 803. The system also brings the user to options update stage 803 if a negative answer is received at update ringback content stage 800. At options update stage 803, if the user chooses not to process changes to the options of the association, then the user is brought to commit stage 806. If modifications to the options are desired, the user inputs these modifications at options input 804. The options are checked for appropriate syntax at options validation 805, and the options are committed to the communications network at commit stage 806. A summary display shows the updated association at summary display 807, and the user is returned to the calling system at exit stage 809.

Figure 9:
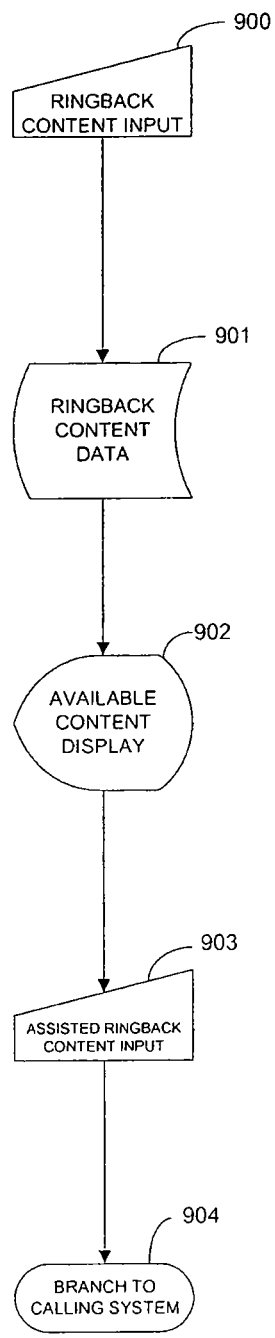
FIG. 9 is a flow diagram illustrating the interaction between a user and the automated ringback update system for displaying all ringback content available on the network.

In an alternative embodiment of the present invention depicted in FIG. 9, the user at ringback content input 900 is presented with a menu of available ringback announcements to facilitate entry of ringback identification alphanumeric codes. These available announcements may be locally stored on the user's handset or station or stored within the communications network or on a third party or network storage device. Ringback content input 900 connects to ringback content data 901, which could be stored locally within the communications network (e.g., in a database or file) or an external device may be queried to retrieve available ringback content data. The data is formatted and presented to the user in user-friendly available content display 902. For example, the handset or station may have an integrated menu or list system for displaying lists of information. The user navigates through the list using hard, soft, or attachable keys (or via voice recognition), and the user highlights the desired ringback content. Assisted ringback content input 903 transfers the content identification alphanumeric corresponding to the selected ringback content to the ringback update system in lieu of manually entering the alphanumeric. The user is returned to the calling system at branch stage 904.

Figure 10:
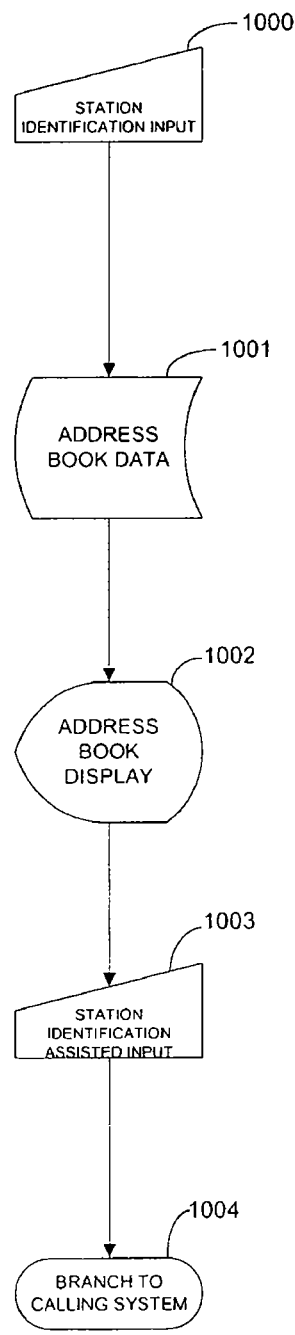
FIG. 10 is a flow diagram illustrating the interaction between a user and the automated ringback update system for displaying all network addresses stored on the user's station.

In another embodiment of the present invention depicted in FIG. 10, the ringback update system links to the user's electronic address book to facilitate inputting network addresses. At station identification input 1000, the user is presented with the address book stored on the handset or station that is accessing the ringback update system. Station identification input 1000 connects to address book data 1001, stored either on the handset or station itself or on a network location. Address book display 1002 lists all the network addresses or telephone numbers contained in the user's address book in a user-friendly menu or list. The user highlights the desired entry and presses the pound ("#") or asterisk ("*") key on the handset to confirm the selection. Station identification assisted input 1003 transfers the selected network address or telephone number to the ringback update system. This obviates the need for manually inputting network addresses, which can be error-prone and time-consuming. The user is returned to the calling system at branch stage 1004.

Figure 11:
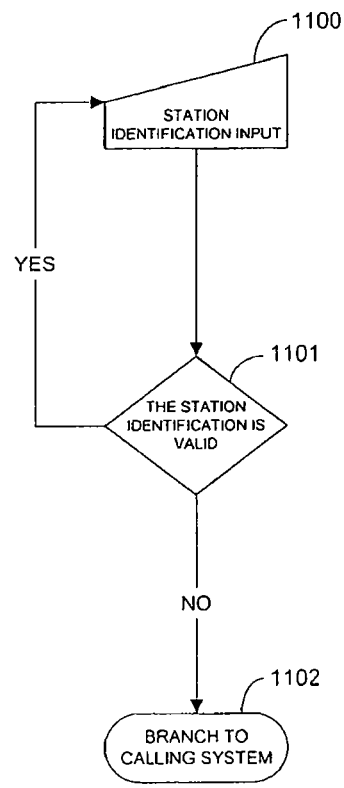
FIG. 11 is a flow diagram illustrating the interaction between a user and the automated ringback update system for selecting more than one network address.

An alternative embodiment of the present invention, depicted in FIG. 11, allows a sequence of more than one network address to be entered at station identification 1100. The user, the network provider, or a third party enters a first network address at station identification input 1100, followed by the pound ("#") or asterisk ("*") key, and then enters another network address followed by the pound ("#") or asterisk ("*") key. Any mode of entering the network address common in the art may be utilized in alternate embodiments, and termination keys pound ("#") and asterisk ("*") may not be required. The station identification is verified at station identification validation stage 1101, and, if valid, the user is returned to station identification input 1100 so that additional network addresses may be entered. The user continues this process until satisfied with the sequence and then presses the pound ("#") or asterisk ("*") key twice in succession to signal the conclusion of the network address input stage. This process effectively creates a group membership list, which may be named and saved by the user on the user's handset or station (or a network location) for potential future use. An invalid entry causes station identification validation stage 1101 to return the user to the calling system at branch stage 1102. In addition, a user may enter a wildcard character (e.g., the number 0) to match all network addresses.

Figure 12:
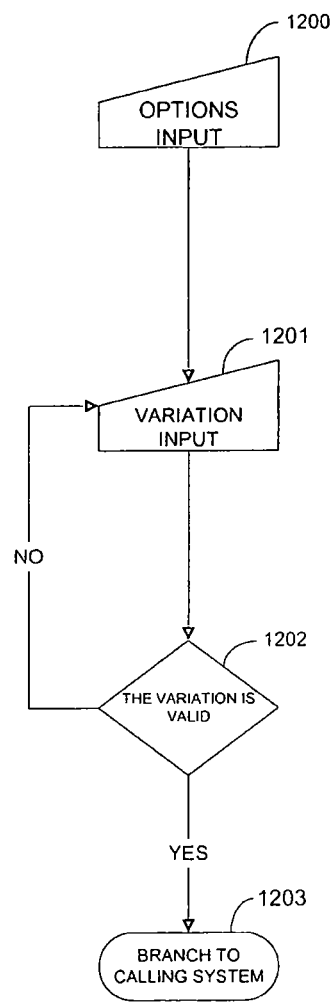
FIG. 12 is a flow diagram illustrating the interaction between a user and the automated ringback update system for selecting a ringback playback variation.

In yet another embodiment of the present invention, the user, the network provider, or a third party is presented with additional playback options as depicted in FIG. 12. Options input 1200 is supplemented with variations input 1201 for the user to specify certain variations on how the ringback content is presented to the calling party. For example, the user can press the number "1" on the handset keypad to denote that only the replacement ringback should be played; number "2" to denote the playing of a single conventional ringback tone followed by the replacement ringback content; and, number "3" to denote the playing of the conventional ringback tone under the replacement ringback content (i.e. a blended conventional and replacement ringback tone). For example, the user enters the desired selection—"1," "2," or "3"—via the keypad on the user's handset or station at variation input 1201. The variation selection is validated by variation validation stage 1202. Certain ringback content may not be eligible for certain variation options (e.g., an interactive game may not be available to be played under a conventional ringback tone since the conventional ringback tone might interrupt the functionality of the game). These announcements are deemed invalid and the user is returned to variation input 1201 so that a valid variation input may be selected. Once a valid variation option is selected, the user is returned to the calling system at branch stage 1203.

Figure 13:
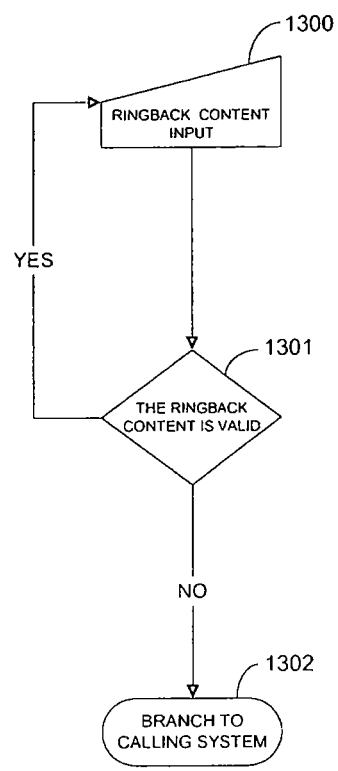
FIG. 13 is a flow diagram illustrating the interaction between a user and the automated ringback update system for creating an album of ringback announcements to be played by the replacement ringback system.

An additional embodiment of the present invention allows a sequence of more than one ringback announcement to be selected as depicted in FIG. 13. At ringback content input 1300, the user, the network provider, or a third party enters a first ringback identification alphanumeric, followed by the pound ("#") or asterisk ("*") key and then enters another ringback identification alphanumeric followed by the pound ("#") or asterisk ("*") key. Each alphanumeric is verified by ringback validation stage 1301, and the user continues this process until satisfied with the sequence. The user either presses the pound ("#") or asterisk ("*") key twice in succession or selects an invalid ringback content to signal the conclusion of the ringback content input. The user is then returned to the calling system at branch stage 1302. This embodiment allows the user to create an "album" of ringback content for the purpose of cycling through the album sequence when replacing a call progress signal. For example, a user might select all the music songs from a particular music album by a certain artist. Each time the caller identified by the appropriate network address calls the user, a new song from the designated album is delivered to the user until all selected songs are delivered, at which point the album begins again. In another example, a user may specify a collection of news articles in a certain category, like sports headlines. Each time the caller identified by the appropriate network address calls the user, an unheard sports headline is delivered to the user until all headlines are delivered, at which point the news album begins again.

Figure 14:
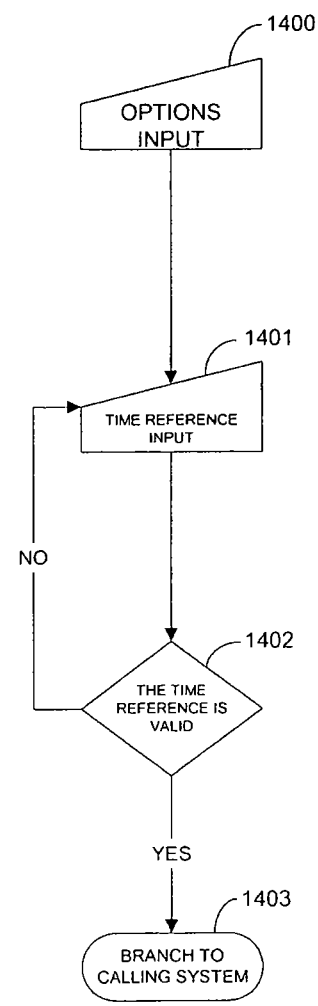
FIG. 14 is a flow diagram illustrating the interaction between a user and the automated ringback update system for associating a time reference or window with a ringback association; and, FIG. 15 is a flow diagram illustrating the interaction between a user and the automated ringback update system for associating a network or geographic location with a ringback association.

Another embodiment utilizes the clock located within or synchronized with the message generator for the user, the network provider, or a third party to select a time reference or window for the playing of replacement content. Options input 1400 is supplemented by time reference input 1401 of FIG. 14, where the user specifies the time of day, day of week, day of month, month of year, or some other time reference (e.g., absolute time measure from present time) to deliver the corresponding announcement. The time reference or window is verified at validation stage 1402, and if the time reference is deemed invalid (e.g., the time format is incorrect or otherwise invalid), the user is returned to time reference input 1401. Simple logic within the message generator or the network signaling system service node requires the additional matching of the selected time reference or window in addition to the correct network address; however, if a wildcard network address is selected as the station identification for the association, the time reference or window will serve to deliver replacement ringback content to all callers based only on the selected time reference or window. For example, this allows for a simple way to deliver the same ringback content to all callers calling during a specified time (e.g., midnight through 8 am when the user is typically asleep). The user is then returned to the calling system at branch stage 1403.

Figure 15:
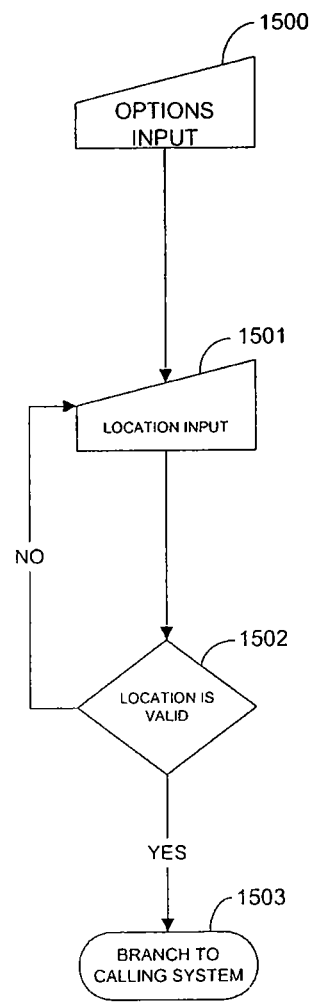

A final embodiment utilizes the updateable look-up table linked to the message generator for a user to specify geographic or network location data for the playing of replacement content. Options input 1500 is supplemented by location input 1501 of FIG. 15, where the user, the network provider, or a third party specifies a network or geographic location for the delivery of the custom announcement. For example, if the network comprises a telephone network, the location data may include an area code (e.g., "212") or an area code-plus-telephone number prefix (e.g., "212-555-"). The replacement association matches all callers within the specified area code or area code-plus-telephone number prefix. This allows for the delivery of custom ringback content to an entire geographic region (e.g., New York City) based on network address or telephone number. The location data may also comprise a domain name, domain prefix, domain suffix (e.g., ".edu" for all educational users), numeric network IP address and subnet mask, or any other discriminating network address value. The location input is verified at validation stage 1502, and if the location data is deemed invalid (e.g., the location format is incorrect or otherwise invalid), the user is returned to location input 1501 to resubmit valid location data. After a valid entry, the user is returned to the calling system at branch stage 1503.

From the foregoing description of the preferred embodiments, which embodiments have been set forth in considerable detail for the purpose of making a complete disclosure of the present invention, it can be seen that the present invention comprises a system for automatically configuring replacement ringback content. It will be appreciated by those skilled in the art that changes could be made to the embodiment described above without departing from the broad inventive concept thereof. It is understood, therefore, that this invention is not limited to the particular embodiment disclosed, but it is intended to cover all modifications that are within the scope and spirit of the invention as defined by the appended claims.

What is claimed is:

1. A system for modifying a communication network, the system comprising:
    an article having a printed matter containing at least one machine recognizable feature;
    a communication station of or associated with a called party and adapted to be connected to the communication network;
    a feature recognition unit connected to the communication station for obtaining first information from the at least one machine recognizable feature;
    a storage device for storing a plurality of announcements; and
    a ringback update system connected to the storage device for modifying the plurality of announcements,
    wherein the communication station or the feature recognition unit transmits the first information to the ringback update system, via the communication network, upon receiving the first information, and
    wherein the ringback update system automatically, without user intervention, modifies the storage device to store at least one announcement associated with the first information in response to receiving the first information.

2. The system as defined in claim 1, wherein at least a portion of a call signal provided to a calling party is replaced by at least a portion of the at least one announcement associated with the first information and delivered to the calling party after the calling party establishes communication with the communication station but before the calling party abandons the communication or before the communication station is answered.

3. The system as defined in claim 1, wherein the communication station or the feature recognition unit transmits second information containing at least one parameter associated with a calling party to the ringback update system, via the communication network and further wherein the ringback update system automatically, without user intervention, creates an association between the at least one announcement and the at least one parameter associated with the calling party in response to receiving the first information and the second information.

4. The system as defined in claim 3, wherein at least a portion of a call signal provided to the calling party is replaced by at least a portion of the at least one announcement and delivered to the calling party after the calling party establishes communication with the communication station but before the calling party abandons the communication or before the communication station is answered.

5. A system for modifying an existing ringback replacement system of the communication network, the system comprising:
    an article having a printed matter containing at least one machine recognizable feature;
    a communication station of or associated with a called party and adapted to be connected to the communication network;
    a feature recognition unit connected to the communication station for obtaining first information from the at least one machine recognizable feature;
    a storage device for storing a plurality of announcements; and
    a ringback update system connected to the storage device for modifying the plurality of announcements,
    wherein the communication station or the feature recognition unit transmits the first information to the ringback update system, via the communication network, upon receiving the first information and transmits second information containing at least one parameter associated with a calling party to the ringback update system, via the communication network, and
    wherein the ringback update system automatically, without user intervention, creates an association between at least one announcement associated with the first information, if the at least one announcement was previously stored on the storage device, and the at least one parameter associated with the calling party in response to receiving the first information and the second information, and
    wherein at least a portion of a call signal provided to the calling party is replaced by at least a portion of the at least one announcement and delivered to the calling party after the calling party establishes communication with the communication station but before the calling party abandons the communication or before the communication is answered by the communication station.

6. A system for modifying an existing ringback replacement system of the communication network, the system comprising:
    an article having a printed matter containing at least one machine recognizable feature;
    a communication station of or associated with a called party and adapted to be connected to the communication network;
    a feature recognition unit connected to the communication station for obtaining first information from the at least one machine recognizable feature;
    a storage device for storing a plurality of announcements; and
    a ringback update system connected to the storage device for modifying the plurality of announcements,
    wherein the communication station or the feature recognition unit transmits the first information to the ringback update system, via the communication network, upon receiving the first information and transmits second information containing at least one parameter associated with a calling party to the ringback update system, via the communication network, and
    wherein the ringback update system automatically, without user intervention, modifies the at least one announcement stored on the storage device and associated with the first information by creating an association between the at least one announcement and the at least one parameter associated with the calling party in response to receiving the first information and the second information, and
    wherein at least a portion of a call signal provided to the calling party is replaced by at least a portion of the at least one announcement and delivered to the calling party after the calling party establishes communication with the communication station but before the calling party abandons the communication or before the communication is answered by the communication station.

7. The system as defined in claim 6, wherein the ringback update system modifies the storage device to store the at least one announcement if the least one announcement is not available in the storage device.

8. The system as defined in claim 6, wherein the call signal contains a ringback signal, a busy signal, a network redirect signal, a call progress signal, a network announcement signal, or a dial tone signal.

9. The system as defined in claim 6, wherein the at least one announcement contains an audio clip, a video clip, a data file, an interactive game, advertising, or programming material.

10. The system as defined in claim 6, wherein the at least one announcement comprises an album of related announcements.

11. The system as defined in claim 6, wherein the communication station comprises a telephone, a wireless telephone, a cellular telephone, a video telephone, a mobile computer, a personal digital assistant, or a multimedia handset.

12. The system as defined in claim 6, wherein the communication network comprises a circuit-switched network, a packet-based network, the Internet, a local area network, a wide area network, a virtual private network, a metropolitan area network, a broadcast network, a wireless network, or a cellular network.

13. The system as defined in claim 6, wherein the machine recognizable feature comprises a barcode, a universal product code, an invisible barcode, a magnetic code, a printed character, a symbol, an icon, an invisible indicia, a two-dimensional figure, a pictorial icon, a photograph, a quantum dot, a fingerprint, a radio frequency identification device, an invisible icon, a watermark, an invisible watermark, a digital watermark, a series of alphanumeric characters, a binary code, a magnetic strip, a code, an analog pattern, or a hieroglyphic character.

14. The system as defined in claim 6, wherein the printed matter is contained in or on a newspaper, a magazine, a book, a billboard, an advertisement, a ticket of admission, a service directory, a business card, a catalog, a photograph, a graphic display, or printed stationery.

15. A method for modifying an existing ringback replacement system of the communication network, comprising:
    receiving, at a ringback update system, second information regarding a machine recognizable feature associated with a printed matter associated with an article and first information regarding at least one parameter associated with a calling party;
    modifying, via a ringback update system, at least one announcement of a plurality of announcements stored in a storage device by storing the at least one announcement to be associated with the first information, wherein the ringback update system automatically, without user intervention, modifies the at least one announcement stored in the storage device;
    downloading the at least one announcement to a network device associated with the ringback update system in response to receiving the second information;
    assigning an association between the at least one announcement and the at least one parameter associated with the calling party in response to receiving the first information and the second information; and
    replacing at least a portion of a call signal with at least a portion of the at least one announcement after the calling party establishes a call to a communication station of or associated with a called party but before the call is abandoned or before the communication is answered by the communication station.

16. The method as defined in claim 15, further comprising modifying the storage device to store the at least one announcement if the at least one announcement is not available in the storage device.

17. The method as defined in claim 15, wherein the call signal comprises a ringback signal, a busy signal, a network redirect signal, a call progress signal, a network announcement signal, or a dial tone signal.

18. The method as defined in claim 15, further comprising replacing at least a portion of the call signal with at least a portion of the at least one announcement for a caller that matches or is associated with the at least one parameter.

19. The method as defined in claim 15, further comprising replacing the call signal for all callers with at least a portion of the at least one announcement.

20. The method as defined in claim 15, wherein the machine recognizable feature associated with the printed matter associated with the article is contained in or on a newspaper, a magazine, a book, a billboard, an advertisement, a ticket of admission, a service directory, a business card, a catalog, a photograph, a graphic display, or printed stationary.

21. A method for modifying an existing ringback replacement system of the communication network, comprising:
    receiving, with the communication network, first information regarding an association between at least one announcement and at least one parameter associated with a calling party;
    receiving second information regarding a machine recognizable feature associated with a printed matter associated with an article;
    downloading the at least one announcement to a network device associated with the ringback update system in response to receiving the second information;
    associating the at least one announcement to the at least one parameter in response to receiving the first information and the second information, wherein the at least one announcement is associated with the second information; and
    replacing at least a portion of a call signal provided to the calling party after the calling party establishes a call with at least a portion of the at least one announcement, wherein the at least a portion of the call signal is replaced with the at least a portion of the at least one announcement and delivered to the calling party before the call is abandoned by the calling party or before the call is answered by a communication station of or associated with a called party,
    wherein the ringback update system automatically, without user intervention, modifies the at least one announcement stored in the storage device and associates the at least one announcement to the at least one parameter in response to receiving the first information and the second information.

22. The method as defined in claim 21, further comprising downloading the at least one announcement if the at least one announcement is not available in the network storage device.

23. The method as defined in claim 21, wherein the call signal comprises a ringback signal, a busy signal, a network redirect signal, a call progress signal, a network announcement signal, or a dial tone signal.

24. The method as defined in claim 21, wherein the at least one parameter is a telephone number, a network address, a time of day, a day of week, a day of year, an area code, a network address prefix, or a network address suffix.

25. The method as defined in claim 21, further comprising replacing the call signal for at least one calling party that matches the at least one parameter.

26. The method as defined in claim 21, further comprising replacing the call signal for each calling party of all calling parties.

27. The method as defined in claim 21, wherein the printed matter is contained in or on a newspaper, a magazine, a book, a billboard, an advertisement, a ticket of admission, a service directory, a business card, a catalog, a photograph, a graphic display, or printed stationary.

* * * * *